United States Patent
Nagase et al.

(10) Patent No.: US 8,777,526 B2
(45) Date of Patent: Jul. 15, 2014

(54) DEEP HOLE PROCESSING DEVICE

(75) Inventors: Yasuo Nagase, Yokohama (JP);
Hiromichi Takahashi, Kawasaki (JP);
Shigeki Otaka, Numazu (JP)

(73) Assignees: Kabushiki Kaisha Toshiba, Tokyo (JP);
Toshiba Kikai Kabushiki Kaisha,
Tokyo (JP)

( * ) Notice: Subject to any disclaimer, the term of this patent is extended or adjusted under 35 U.S.C. 154(b) by 614 days.

(21) Appl. No.: 13/045,314

(22) Filed: Mar. 10, 2011

(65) Prior Publication Data

US 2011/0229280 A1 Sep. 22, 2011

(30) Foreign Application Priority Data

Mar. 16, 2010 (JP) .................................. 2010-59386

(51) Int. Cl.
*B23B 39/00* (2006.01)
*B23Q 11/10* (2006.01)

(52) U.S. Cl.
USPC .................................. 408/57; 408/10; 408/95

(58) Field of Classification Search
USPC ........................ 408/97, 95, 98, 10, 56, 57, 59
See application file for complete search history.

(56) References Cited

U.S. PATENT DOCUMENTS

| | | | |
|---|---|---|---|
| 3,097,891 A | * | 7/1963 | Brideau .......................... 384/31 |
| 3,523,485 A | * | 8/1970 | Klein ............................. 409/202 |
| 3,730,634 A | * | 5/1973 | Gerber et al. ................... 408/22 |
| 4,636,118 A | * | 1/1987 | Hunt .............................. 409/136 |
| 4,885,836 A | * | 12/1989 | Bonomi et al. ............... 29/524.1 |
| 4,917,547 A | * | 4/1990 | Frederickson et al. ........ 408/1 R |
| 5,800,099 A | * | 9/1998 | Cooper .......................... 408/1 R |

FOREIGN PATENT DOCUMENTS

| | | |
|---|---|---|
| CN | 201023141 | 2/2008 |
| CN | 201353656 | 12/2009 |
| JP | 54-111189 | 8/1979 |
| JP | 62-24203 B2 | 5/1987 |

OTHER PUBLICATIONS

Background Art Information provided by inventors explaining relevance of JP 62-024203 published May 27, 1987 and signed by inventors on Nov. 8, 2010 and Nov. 22, 2010.
Chinese Office Action issued in CN 201110063360.2 on Nov. 16, 2012.
English Language Translation of Chinese Office Action issued in CN 201110063360.2 on Nov. 16. 2012.
English Language Abstract of CN201353656 published Dec. 2, 2009.
English Language Abstract of CN 201023141 published Feb. 20, 2008.
English Language Abstract for JP 54-111189 published Aug. 31, 1979.

\* cited by examiner

*Primary Examiner* — Daniel Howell
*Assistant Examiner* — Chwen-Wei Su
(74) *Attorney, Agent, or Firm* — DLA Piper LLP (US)

(57) ABSTRACT

There is provided a deep hole processing device for forming a hole by rotational movement of a main spindle to which a tool is attached of a portal machine toward a workpiece, having, a bush having a hole diameter for guiding rotational movement of the tool, and a bush holding unit provided on a cross rail capable of moving on columns of the portal machine for holding the bush with respect to a spindle head on which the main spindle is mounted at a predetermined distance, wherein a position of the bush relative to the workpiece and a pressure at which the bush is pressed against the workpiece may be controlled by movement of the cross rail.

10 Claims, 9 Drawing Sheets

DEEP HOLE PROCESSING DEVICE

CROSS REFERENCE TO RELATED APPLICATION

This application is based upon and claims benefit of priority under 35 USC 119 from the Japanese Patent Application No. 2010-59386, filed on Mar. 16, 2010, the entire contents of which are incorporated herein by reference.

BACKGROUND

1. Field

The present invention relates to a deep hole processing device like a machine tool for drilling.

2. Related Art

Deep hole processing is making a hole with a large ratio between depth and diameter. In deep hole processing, common processing systems include a gun drill system, a boring and trepanning association (BTA), system and an ejector system.

Deep hole processing tools are typically long and have relatively small diameters relative to their lengths. Therefore, it is difficult to perform of high accuracy processing due to bending and buckling of the tool and rotational deflection of the tool during attachment.

Figure 9A:
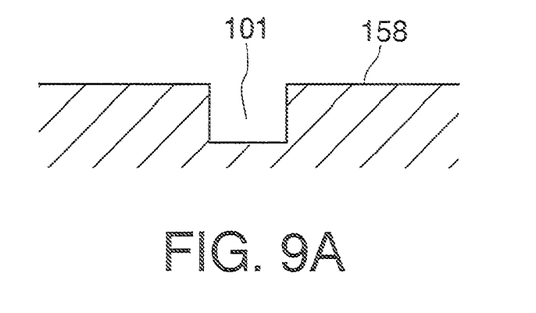
FIGS. 9A to 9C are illustrative diagrams of an example of a procedure of a conventional deep hole processing.
Figure 9B:
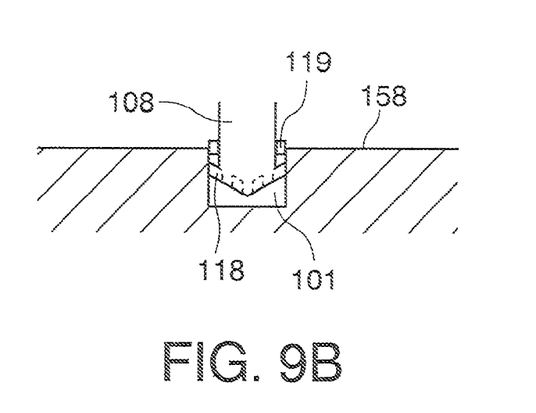
Figure 9C:
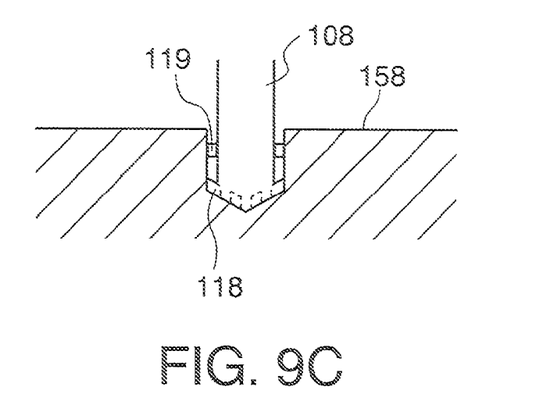

Therefore, conventionally, as illustrated in FIG. 9A, a pilot hole 101 is provided in advance on a workpiece 158 using a short tool and a deep hole is processed using a long tool using the pilot hole as a guide. As illustrated in FIG. 9B, a guide pad 119 provided on an outer periphery of a long tool 108 in a slightly projected manner is brought into contact with the pilot hole 101. Then, as illustrated in FIG. 9C, the processing is performed by a blade 118 provided on a tip end of the tool 108. Alternatively, a bush guide is attached to the processing device and the hole processing is performed using the bush guide as the guide. An example of the conventional deep hole processing device is hereafter described in Japanese Patent Application Laid-Open No. S62-24203

However, when providing the above-described pilot hole, advance processing using the short tool is required, thereby resulting in low work efficiency. Also, when performing the processing using the bush guide, a mechanism to press the bush guide against the workpiece is required and it is problematically difficult to use a general-purpose machine.

SUMMARY OF THE INVENTION

The present invention is achieved in view of the above-described circumstances, and an object thereof is to provide a deep hole processing device capable of realizing deep hole processing of high accuracy using a general-purpose machine without necessity of processing a pilot hole.

According to the present invention, there is provided a deep hole processing device for forming a hole by rotational movement of a main spindle of a portal machine to which a tool is attached toward a workpiece, comprising, a bush having a hole diameter for guiding rotational movement of the tool, and a bush holding unit provided on a cross rail capable of moving on the columns of the portal machine for holding the bush with respect to a spindle head on which the main spindle is mounted at a predetermined distance, wherein a position of the bush relative to the workpiece and a pressure at which the bush is pressed against the workpiece may be controlled by movement of the cross rail.

According to the deep hole processing device of the present invention, time and effort to process the pilot hole is not necessary and high accuracy deep hole processing becomes possible using the general-purpose machine.

DETAILED DESCRIPTION OF THE EMBODIMENTS

Hereafter, a deep hole processing device according to an embodiment of the present invention will be described with reference to the drawings.

Figure 1:
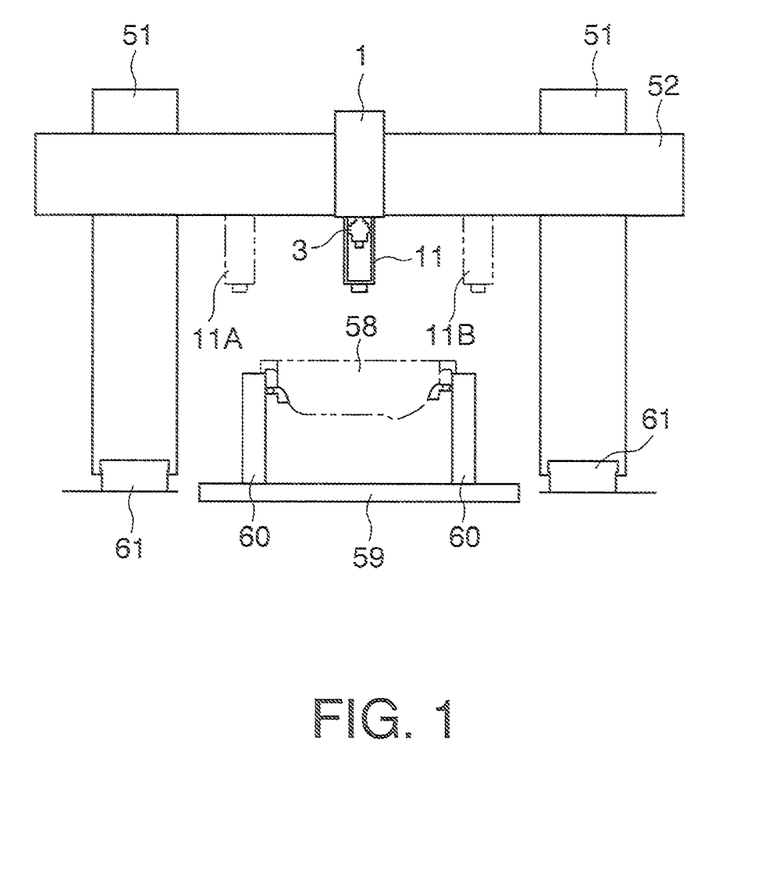
FIG. 1 is a front view of a schematic configuration of a general-purpose portal machine used in a deep hole processing device according to an embodiment of the present invention.

FIG. 1 illustrates an overall schematic configuration of a deep hole processing device according to this embodiment in a state in which a bush and a bush holding unit are attached to a general-purpose portal machine.

A column 51 is provided so as to move on a bed 61 forward and backward in a direction perpendicular to a plane of paper.

A cross rail 52 is provided so as to vertically move on the column 51.

A spindle head 1 is provided so as to horizontally move on the cross rail 52. The spindle head 1 is provided with a ram 2 to be described later inside thereof, and a main spindle for rotating a tool is built in the ram 2. A rotary joint 3 is connected to the main spindle.

A bush holding unit 11 to be described later is connected to a lower portion of the spindle head 1 so as to cover the rotary joint 3 and the ram. By the horizontal movement of the spindle head 1 on the cross rail 52, the bush holding unit 11 may horizontally move to positions indicated by reference numerals 11A and 11B.

A workpiece 58 to which deep hole processing is performed is fixed on a surface plate 59 by a jig 60 and the like.

The cross rail 52 moves downward and stops when a bush 9 to be described later is brought into contact with the workpiece 58 and a predetermined pressure is applied thereto. Thereafter, the rotary joint 3 connected to the main spindle built in the ram 2 to be described later moves downward toward the workpiece 58 while rotating, thereby performing the processing.

Figure 2:
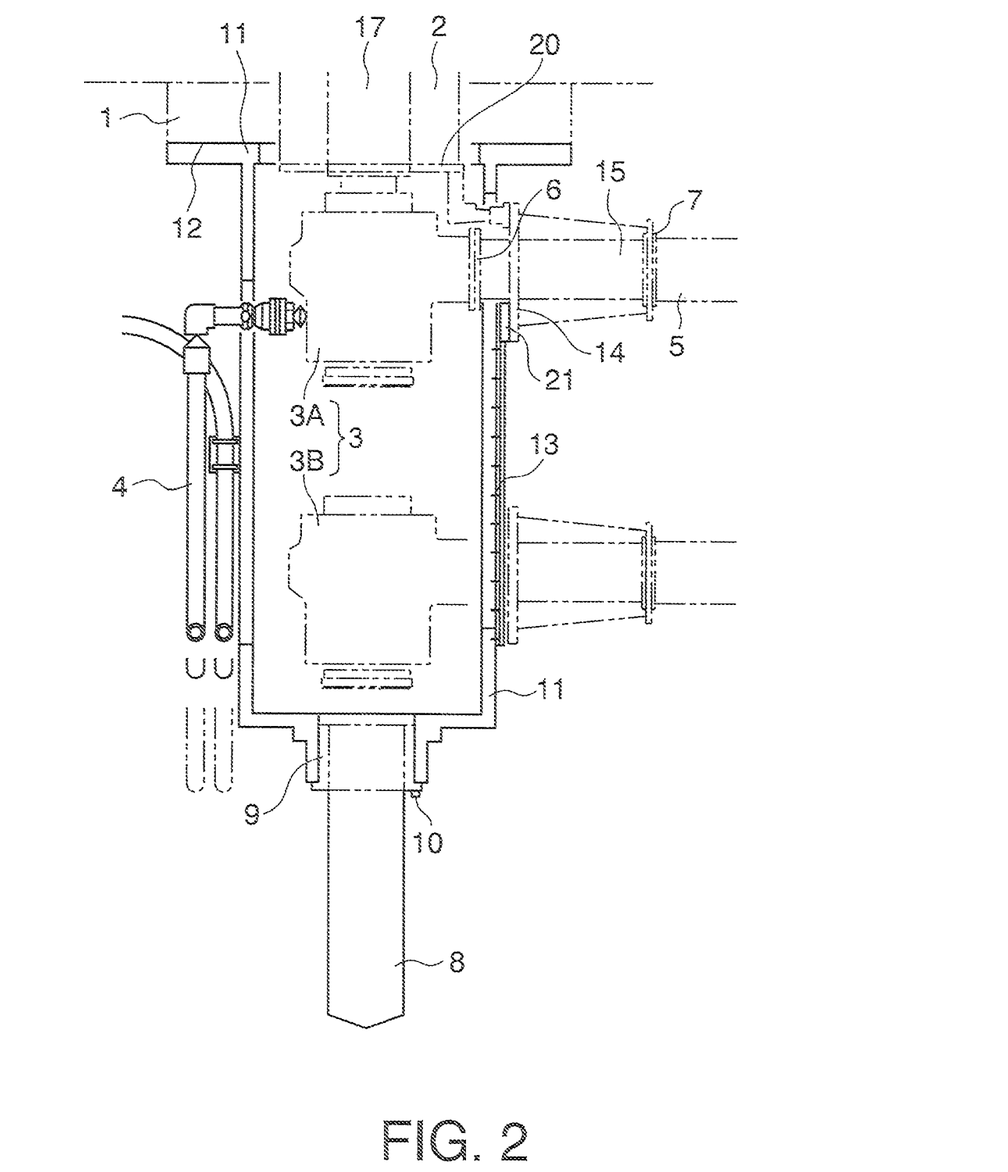
FIG. 2 is a front view of a configuration in the vicinity of a main spindle of the deep hole processing device according to the same embodiment.

FIG. 2 illustrates a principal configuration in the vicinity of the main spindle of the deep hole processing device according to this embodiment.

The spindle head 1 is provided as a part of the portal machine so as to be movable in a horizontal direction in the drawing as illustrated with reference to FIG. 2.

The ram 2 is arranged as a part of the portal machine so as to be able to be built in the spindle head 1 and is vertically movable relative to the spindle head 1. Further, a main spindle 17 is mounted in the ram 2 and is vertically movable relative to the spindle head 1 similarly.

The rotary joint 3 is connected to the main spindle 17, a rotary main spindle and a bearing for supporting the rotary main spindle not illustrated are provided in the rotary joint 3, and the rotary main spindle and a tool 8 are coupled to each other. By vertical movement of the ram 2 with the built-in main spindle 17, the rotary joint 3 may vertically move as indicated by reference numerals 3A and 3B.

Further, the rotary joint 3 has a function as a flow passage of cutting oil to the tool 8. An oil supplying hose 4 is connected to the rotary joint 3 to supply the cutting oil. The tool 8 is a so-called ejector-type and is provided with a double tube structure with an outside outer tube and an inner tube inside thereof. The cutting oil supplied from the rotary joint 3 is transmitted between the outer tube and the inner tube to flow downward toward the workpiece. A tip end of the tool 8 cuts the workpiece and a chip is pushed upward in the inner tube together with the cutting oil.

A flexible tube 15 is further connected to the rotary joint 3 by a joint 6 and a discharge side hose 5 is further mounted thereon by a joint 7. The chip and the cutting oil pushed in the inner tube of the tool 8 pass through the discharge side hose 5 through the rotary joint 3 to be discharged to outside.

Figure 3:
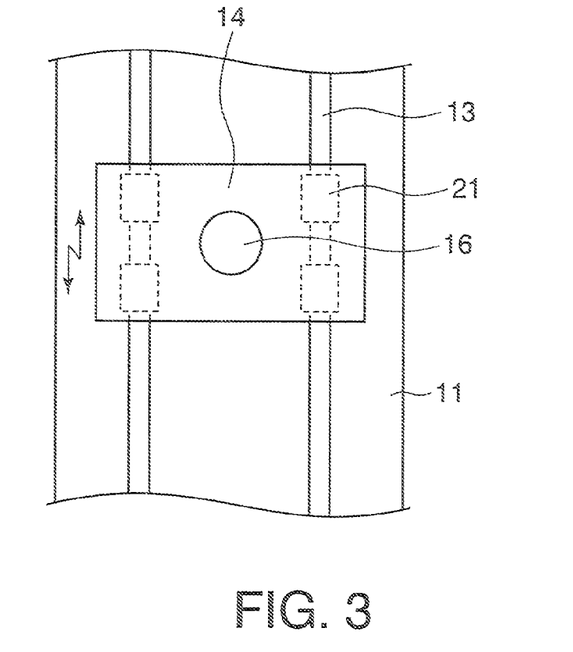
FIG. 3 is a front view illustrating a configuration of a guide rail and a slider for supporting a discharge side hose in the deep hole processing device according to the same embodiment.

The flexible tube 15 and the discharge side hose 5 pass through a hole 16 on a sliding plate 14 as illustrated in FIG. 3 and are vertically movable following vertical movement of the tool 8 by vertical sliding of a discharge tube holding unit 21 on a guide rail 13. The flexible tube 15 and the discharge side hose 5 may be attached to and detached from the rotary joint 3 as necessary.

Since the flexible tube 15 and the discharge side hose 5 are held by the sliding plate 14 provided with the discharge tube holding unit 21, which vertically slides on the guide rail 13, in this manner, it is possible to prevent a load and rotation moment generated by the flexible tube 15 and the discharge side hose 5 from being applied only to the rotary joint 3. Almost entire load is directly held by the ram 2 through a rotation stopping plate 20.

Meanwhile, it is not required that the sliding plate 14 necessarily has the hole 16, and it may have a structure capable of supporting the flexible tube 15 and the discharge side hose 5. It is also possible to use a discharge tube in place of the discharge side hose 5.

Figure 4:
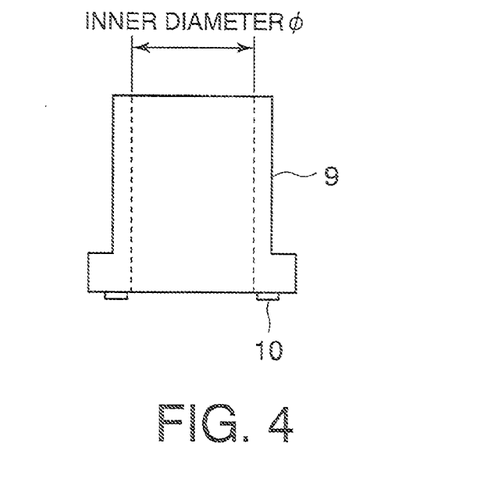
FIG. 4 is a front view illustrating a structure of a bush in the deep hole processing device according to the same embodiment.

FIG. 4 illustrates an example of a configuration of the bush 9. The bush 9 is configured to guide the tool 8 during the processing and acts as replacement for a pilot hole as described later.

The bush 9 is mounted on the spindle head 1 by the bush holding unit 11 and vertically moves together with vertical movement of the spindle head 1.

The bush 9 has an inner diameter 4 set to be identical to a drill diameter of the tool 8 or to be larger than the drill diameter within an allowable accuracy range, and is replaced according to the drill diameter of the tool 8 to be used to be attached to the bush holding unit 11.

A pressure sensor 10 is mounted on a portion, which is brought into contact with the workpiece, on a tip end of the bush 9.

The bush holding unit 11 illustrated in FIG. 2, which is configured to fasten the bush 9 to the spindle head 1 by some means such as a bolt, may be replaced with another bush holding unit as necessary on an attaching surface 12 of the spindle head 1.

Figure 5:
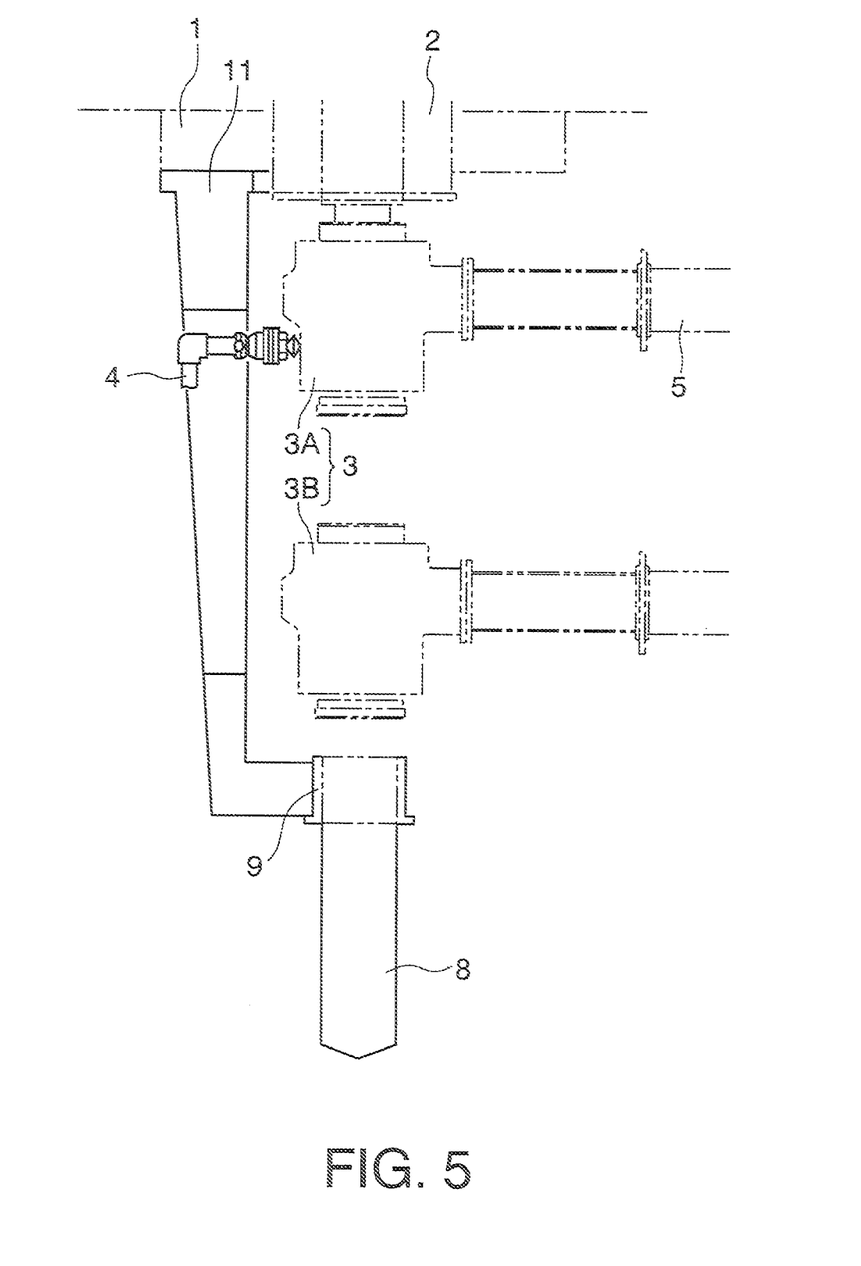
FIG. 5 is a front view of a configuration of a variation of a bush holding unit in the deep hole processing device according to the same embodiment.

The bush holding unit 11 has a case-like structure to enclose the rotary joint 3, the tool 8 and the ram 2 and has a longitudinal dimension so as not to prevent a maximum distance of the vertical movement of the rotary joint 3. FIG. 2 illustrates box shape of which cross section is square of the case-like structure as an example of the bush holding unit 11. Meanwhile, the cross section of the bush holding unit 11 may be other than square. However, it is not required that the bush holding unit 11 necessarily has such case-like structure, and the shape is not limited and may be variously changed. For example, as illustrated in FIG. 5, the bush holding unit, which may press the bush 9 against the workpiece by fastening the bush 9 to the spindle head 1 with a predetermined distance therebetween, may be used. For example, although the bush 9 is fastened to the spindle head 1 by one member in FIG. 5, they may be fastened to each other by a plurality of members. Also, although one bar-like member is taken as an example in FIG. 5, a plurality of bar-like members may also be used. Also, the member is not limited to the bar-like member.

Also, the structure, an outer diameter and a shape of the bush 9 may be variously changed if the bush 9 has the inner diameter 4 identical to or slightly larger than the drill diameter of the tool 8.

Figure 6:
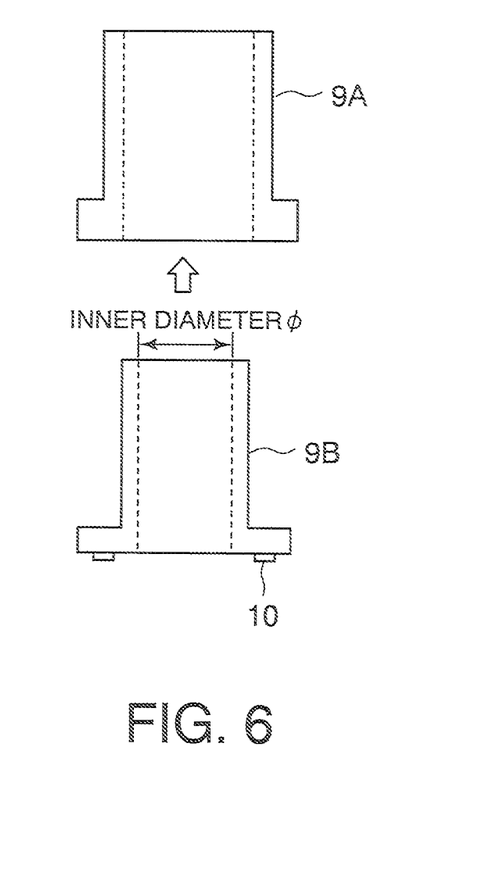
FIG. 6 is a front view of a configuration of a variation of the bush in the deep hole processing device according to the same embodiment.

For example, as illustrated in FIG. 6, the bush 9 may have a structure composed of a plurality of parts such as two parts, which are a bush fixture 9A and a bush 9B. In this case, the bush 9B is housed in the bush fixture 9A and an inner diameter 4) of the bush 9B is identical to or slightly larger than the drill diameter of the tool 8. The bush fixture 9A is attached to the bush holding unit 11. By replacing the bush 9B according to the drill diameter of the tool 8, it becomes not necessary to replace the bush for the bush holding unit 11 and it becomes easy to use the tool 8 with different drill diameter.

A procedure to perform the hole processing using the deep-hole processing device according to this embodiment is described with reference to FIGS. 7A to 7F.

Figure 7A:
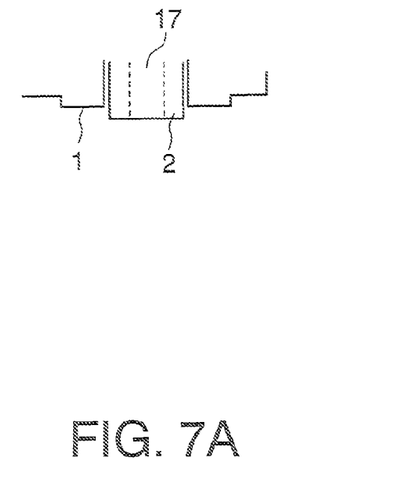
FIGS. 7A to 7F are illustrative diagrams of a procedure to perform deep hole processing using the deep hole processing device according to the same embodiment.

FIG. 7A illustrates the vicinity of the main spindle of the general-purpose portal machine at a stage at which the rotary joint 3 and the tool 8 are not attached. As described with reference to FIG. 1, the ram 2 is provided so as to be able to be built in the vertically movable spindle head 1, and the main spindle 17 is mounted in the ram 2.

Figure 7B:
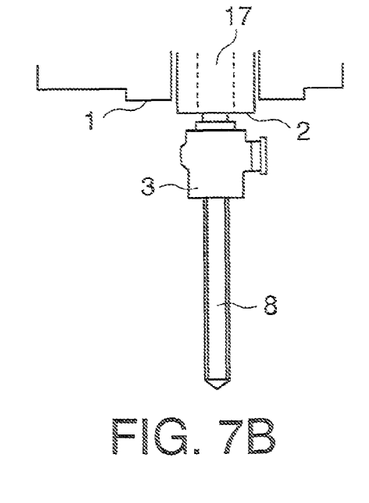

As illustrated in FIG. 7B, the rotary joint 3 to which the tool 8 is attached is attached to the main spindle 17 in the ram 2.

Figure 7C:
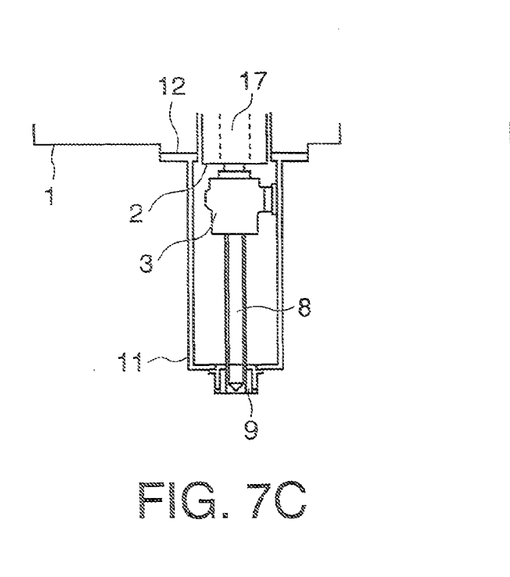

As illustrated in FIG. 7C, the bush holding unit 11 to which the bush 9 having the inner diameter identical to or slightly larger than the drill diameter of the tool 8 corresponding to a diameter of a hole to be processed is attached is attached to the attaching surface 12 of the spindle head 1.

Figure 7D:
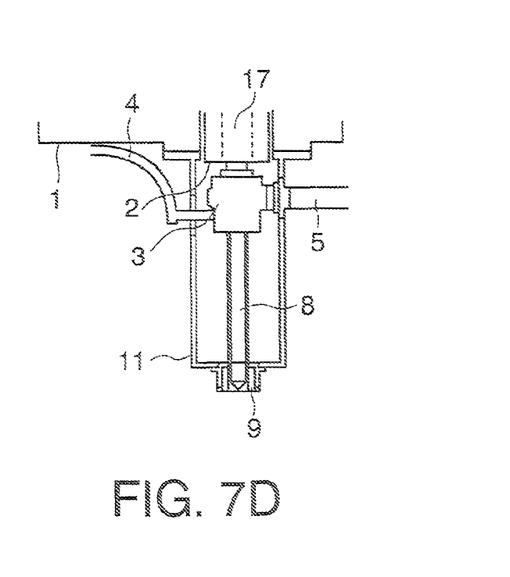

As illustrated in FIG. 7D, the oil supplying hose 4 and the discharge side hose 5 are attached to the rotary joint 3.

Figure 7E:
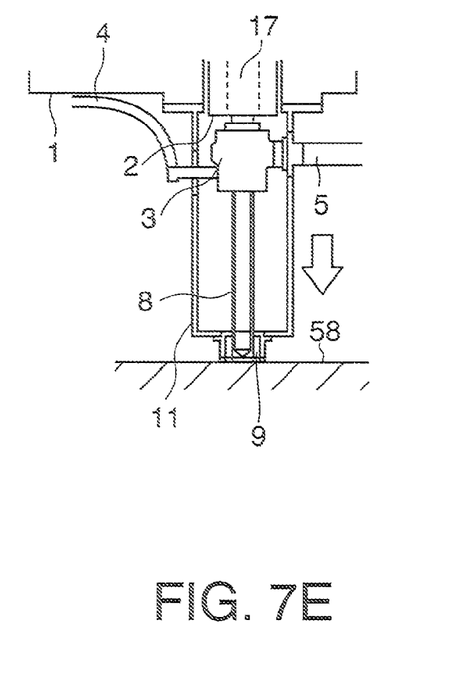

As illustrated in FIG. 7E, the cross rail 52 is lowered, thereby moving the spindle head 1 downward to press the bush 9 against a machined surface of the workpiece 58. At that time, when the pressure sensor 10 provided on the tip end of the bush 9 detects a pressure not smaller than a predetermined value, the movement of the cross rail 52 is stopped and pressing of the bush 9 against the workpiece 58 is stopped.

Figure 7F:
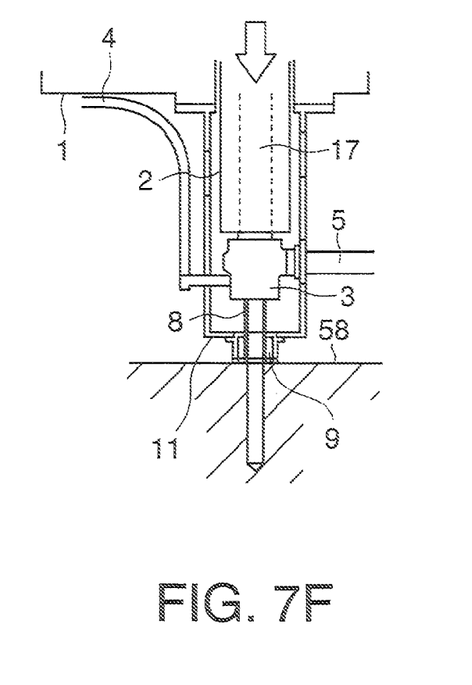

As illustrated in FIG. 7F, by rotating the main spindle 17 of the spindle head 1 while supplying the cutting oil from the oil supplying hose 4, the ram 2 is lowered in a direction indicated by an arrow to perform the hole processing.

The cutting oil supplied from the oil supplying hose 4 flows between the outer tube and the inner tube of the tool 8 to be supplied to the tip end of the tool 8, and pushed upward in the tube together with the chip to be discharged to outside through the discharge side hose 5.

As described with reference to FIGS. 9A to 9C, it is conventionally required that the hole processing is performed by providing the pilot hole on the workpiece in advance, bringing a guide pad fitted to a part of an outer peripheral surface of the tool in a projected manner into contact with the pilot hole and using the portion as a guide. On the other hand, such pilot hole is not necessary according to the deep hole processing device of this embodiment.

Figure 8A:
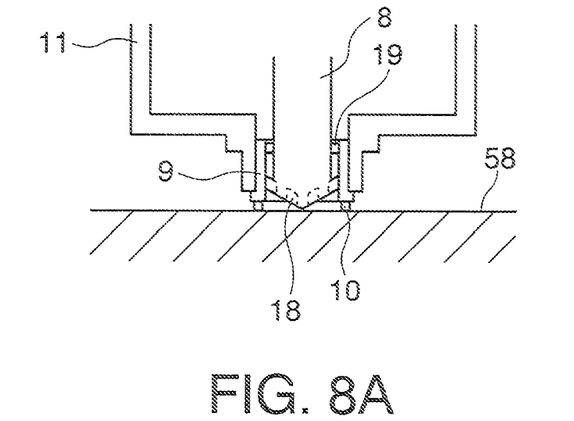
FIGS. 8A and 8B are illustrative diagrams of an action of the bush in the deep hole processing device according to the same embodiment.

As illustrated in FIG. 8A, the bush 9 is pressed against the machined surface of the workpiece 58 without the pilot hole at a predetermined pressure as described with reference to FIG. 7E. The processing is started in a state in which a guide pad 19 of the tool 8 is brought into contact with an inner peripheral surface of the bush 9. According to this, the bush 9 acts as the pilot hole and the hole processing is started using the guide pad 19, which is brought into contact with the bush 9, as the guide.

Figure 8B:
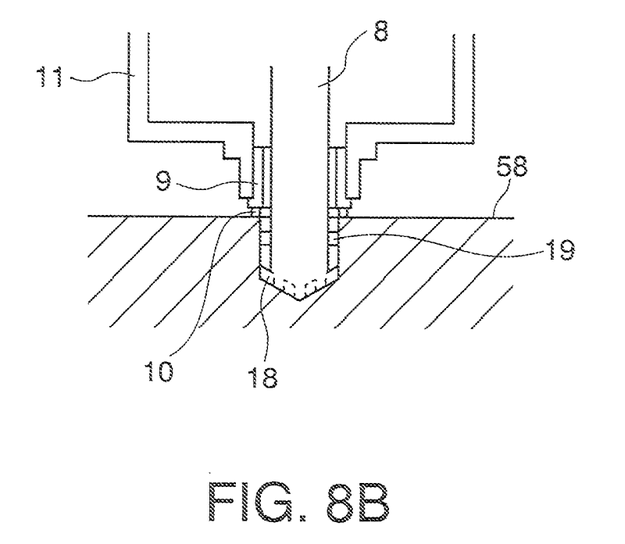

As illustrated in FIG. 8B, the tool 8 cuts the workpiece 58 as the ram 2 lowers. The guide pad 19 of the tool 8 passes through the bush 9 and is brought into contact with an inner wall of a processed hole, and the processing is further performed by using the same as the guide.

As described above, according to the deep hole processing device according to this embodiment, the processing of the pilot hole is not necessary and highly efficient processing of the deep hole of high accuracy becomes possible by using the general-purpose portal machine without a dedicated machine.

Meanwhile, an ejector drill is used as the tool 8 in this embodiment. However, the tool, which may be used, is not limited to this, and all the tools for processing by using the guide such as a BTA and a gun drill may be used.

The above-described embodiment is merely an example and this does not limit the present invention, and this may be variously changed within the technical scope of the present invention.

The invention claimed is:

1. A deep hole processing device for forming a hole by rotational movement of a main spindle of a portal machine toward a workpiece, wherein a tool is capable of being attached to the main spindle, the deep hole processing device comprising:
a rotary joint capable of connecting the tool to the main spindle, the rotary joint being connected to a hose on an oil filler side supplying cutting oil to the tool;
a bush having a cylindrical shape, and having a hole diameter for guiding rotational movement of the tool;
a spindle head on which the main spindle is mounted such that the main spindle is capable of moving up and down, the main spindle being provided on a cross rail capable of moving on columns of the portal machine;
a bush holding unit having a cylindrical shape and connected to the spindle head such that the bush holding unit is capable of being attached to and detached from the spindle head, the bush holding unit holding the bush at an apical end of the bush holding unit with respect to the spindle head at a distance which allows the rotary joint to move up and down without being obstructed; and
a pressure sensor provided on a contacting portion of the bush with the workpiece; wherein
the movement of the cross rail is controlled according to a pressure value detected by the pressure sensor.

2. The deep hole processing device according to claim 1, wherein
the bush holding unit holds the bush with respect to the spindle head at the distance longer than a maximum movement distance through which the main spindle may move relative to the spindle head.

3. The deep hole processing device according to claim 1, wherein the bush holding unit is formed of a bar-like member.

4. The deep hole processing device according to claim 1, comprising:
a plurality of bushes each having a hole diameter corresponding to a diameter of the tool, wherein
the bush holding unit holds the bush corresponding to the tool to be used.

5. The deep hole processing device according to claim 1, wherein
the bush has a double structure having a plurality of first bushes each having a hole diameter for guiding the rotational movement of the tool and having different hole diameters according to a diameter of the tool, and
a second bush having an inner diameter corresponding to outer diameters of the first bushes on which the first bushes may be mounted, and
the first bushes may be replaced according to the tool.

6. The deep hole processing device according to claim 1, further comprising:
a guide rail provided along a direction of movement of the main spindle; and
a slider capable of sliding on the guide rail and supporting the hose connected to the rotary joint.

7. The deep hole processing device according to claim 2, wherein the bush holding unit is formed of a bar-like member.

8. The deep hole processing device according to claim 2, comprising:
a plurality of bushes each having a hole diameter corresponding to a diameter of the tool, wherein
the bush holding unit holds the bush corresponding to the tool to be used.

9. The deep hole processing device according to claim 2, wherein
the bush has a double structure having a plurality of first bushes each having a hole diameter for guiding the rotational movement of the tool and having different hole diameters according to a diameter of the tool, and
a second bush having an inner diameter corresponding to outer diameters of the first bushes on which the first bushes may be mounted, and
the first bushes may be replaced according to the tool.

10. The deep hole processing device according to claim 2, further comprising:
a guide rail provided along a direction of movement of the main spindle; and
a slider capable of sliding on the guide rail and supporting the hose connected to the rotary joint.

* * * * *